March 7, 1933.                    W. H. SILVER                    1,900,525
                                 TRACTOR GUIDE
                           Filed Sept. 22, 1930            3 Sheets-Sheet 1

INVENTOR
Walter H. Silver
BY Brown, Jackson,
Boettcher & Dienner
ATTORNEY

WITNESS
Walter Ackerman

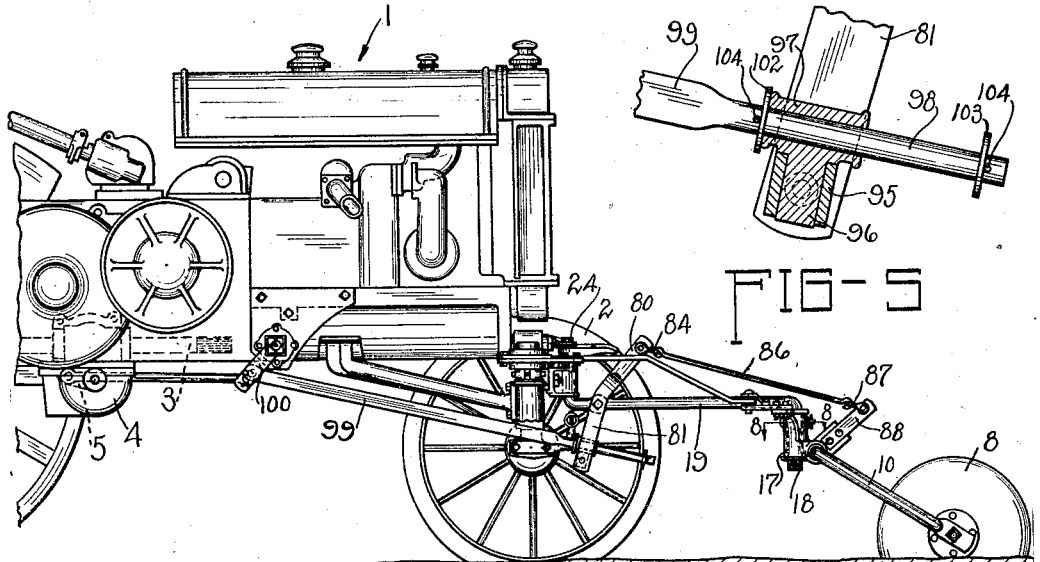
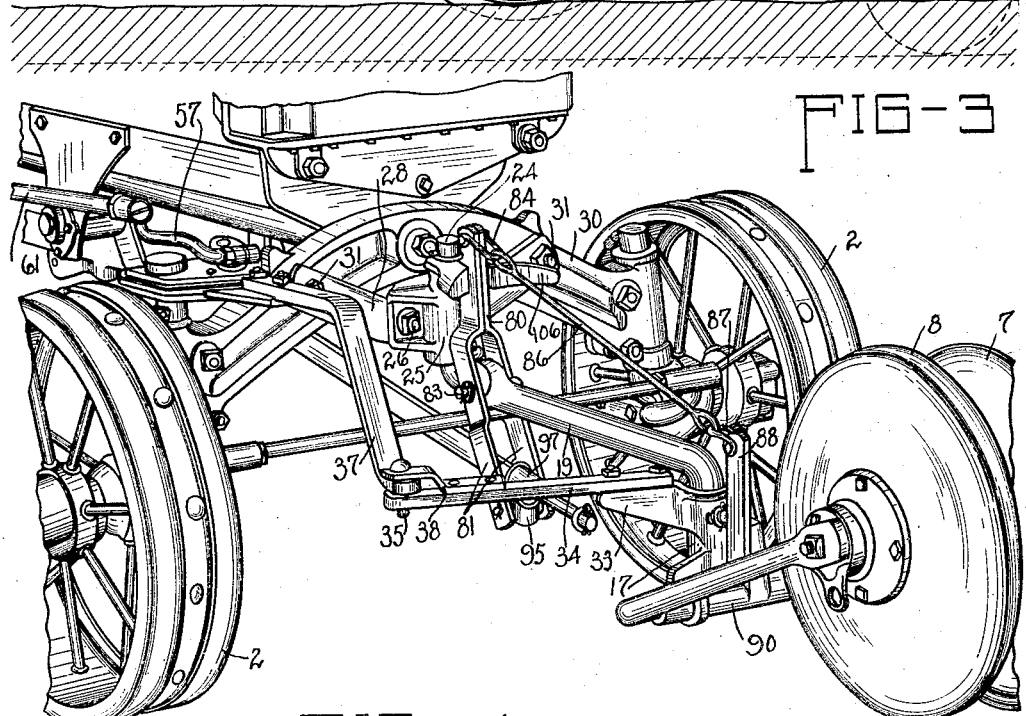

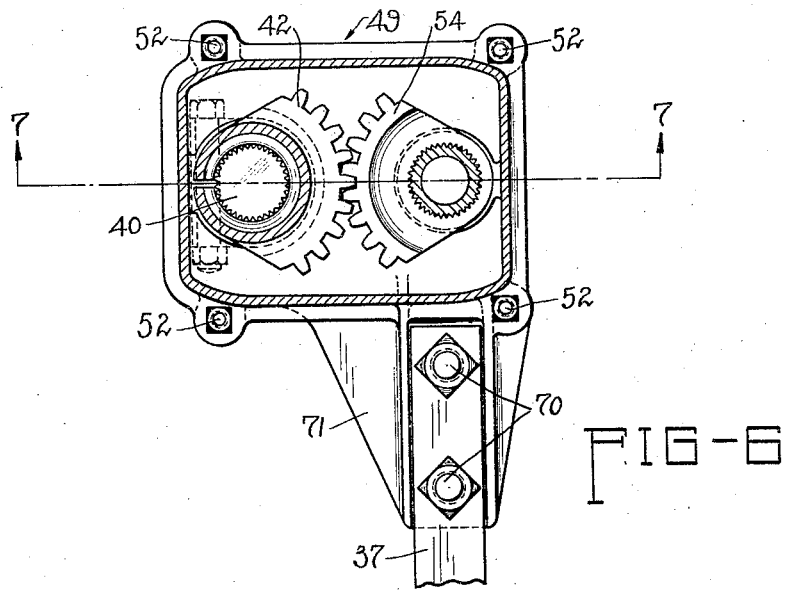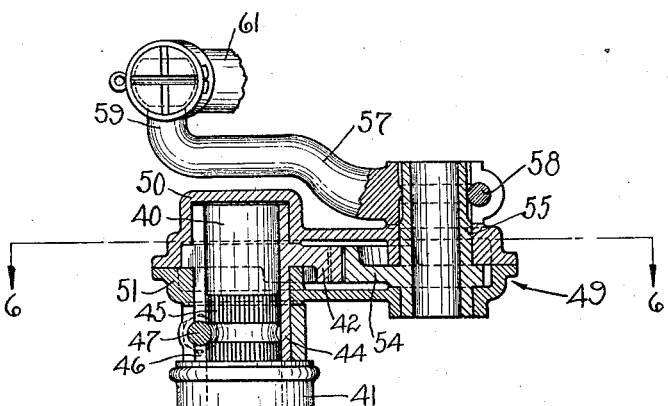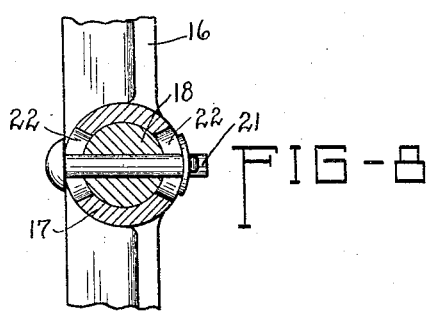

Patented Mar. 7, 1933

1,900,525

UNITED STATES PATENT OFFICE

WALTER H. SILVER, OF MOLINE, ILLINOIS, ASSIGNOR TO DEERE & COMPANY, OF MOLINE, ILLINOIS, A CORPORATION OF ILLINOIS

TRACTOR GUIDE

Application filed September 22, 1930. Serial No. 483,501.

The present invention relates generally to steering means for tractors and other self-moving vehicles. More particularly, the present invention is concerned with the provision of improvements in auxiliary steering devices adapted to be attached to tractors and the like and serving to automatically guide the tractor relative to a furrow previously made in the ground.

The principal object of the present invention is the provision of mechanism in the usual steering system ahead of the steering worm which places the steering or dirigible wheels under the control of the auxiliary steering means without making any disconnection of the regular steering system and without necessitating any looseness in the joints of the regular steering system.

In prior tractor guides when it is desired to steer the tractor by the usual steering wheel through the regular steering system, it is necessary to disconnect the tractor guide from the dirigible wheels of the tractor and reconnect the regular steering system if a disconnection has been made in that system. Other tractor guides of the prior art were employed in a construction where there was sufficient looseness between the links of the regular steering system up to the steering worm to give the tractor guide control of the steering wheels, but such control in this case was operable only within the limits of the looseness of the connections. These defects have been obviated in the present invention.

Another object of the present invention is the provision of a tractor guide or auxiliary steering system which is adapted to be raised and lowered to and from inoperative position by means of the usual power lift of the tractor.

Another object of the present invention is to provide a tractor guide movable to and from operative position by the usual power lift of the tractor and with which is associated locking means for preventing lateral movement of the tractor guide when the same is elevated, whereby the steering or dirigible wheels of the tractor are automatically placed under the control of the regular steering system.

Another object of the present invention is the provision in a tractor guide of a system of linkage permitting the ground contacting elements to move bodily laterally in following the guide furrow to shift the dirigible wheels of the tractor.

Other objects and advantages of the present invention will be apparent to those skilled in the art after a consideration of the following detailed description of the preferred embodiment of the same, taken in conjunction with the accompanying drawings, in which:—

Figure 3 is a vertical elevational view corresponding to Figure 1 and illustrating more particularly the connections between the power lift of the tractor and the auxiliary steering means;

Figure 4 is an enlarged perspective view;

Figure 5 is a detail section on an enlarged scale and illustrating a portion of the connections between the tractor guide and the power lift;

Figure 6 is an enlarged view, partly in section and partly in elevation, corresponding to a view taken along the line 6—6 of Figure 7, and showing in detail the construction of the differential means by which steering effort applied to either the regular steering means or the tractor guide is operable to shift the dirigible wheels of the tractor;

Figure 7 is a view taken along the line 7—7 of Figure 6; and

Figure 8 is an enlarged section taken on the line 8—8 of Figure 5.

Figure 1:
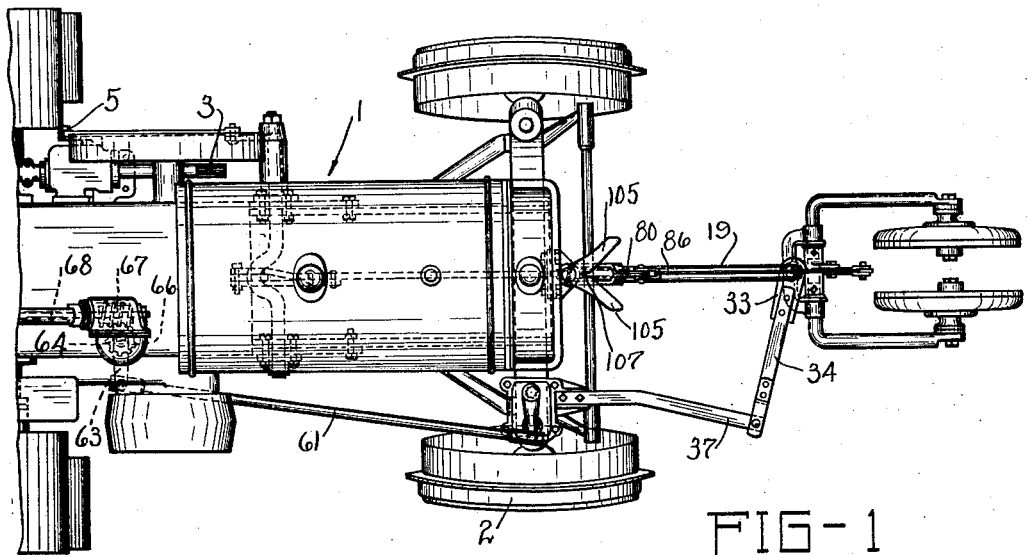
Figure 1 is a top plan view of the forward portion of a tractor of the usual type provided with a tractor guide constructed according to the present invention.

Referring now to the drawings, the reference numeral 1 indicates in its entirety a tractor of the usual type having front dirigible or steering wheels 2, a power take off 3 and a power lift 4. The power lift 4 includes a fore and aft swinging crank 5 which is utilized in the structure in which the present invention is embodied, for a purpose to be described later.

The tractor guide of the present invention includes guiding or earth contacting elements in the form of a pair of bell wheels 7 and 8 adapted to ride in a furrow and follow the irregularities thereof, the furrow being opened by furrow openers (not shown) secured to or drawn by the tractor 1. The bell wheels 7 and 8 are journaled on the ends of the forwardly extending arms 9 and 10 of the crank axles 11 and 12. The crank axles 11 and 12 have laterally directed portions journaled in bearing openings in the journal extensions 14 and 15 of a U-shaped casting 16. The casting 16 has a vertical bearing sleeve 17 by which it is pivotally mounted on the downturned front end 18 of a forwardly extending link 19 pivotally carried at the front end of the tractor. Preferably, the casting 16 is rotatably held to the front end 18 of the link 19 for limited pivotal movement relative thereto by means of a pin or bolt 21, best shown in Figure 8 where it will be observed that the pin 21 is received within slots 22 formed in the bearing sleeve 17.

The rear end of the link 19 has an upturned portion 24 which is journaled in a vertical bearing member 25 secured in any manner desired, as by bolts 26, to an angularly bent bracket 28 bolted to the front axle 30 of the tractor by bolts 31. In this manner lateral swinging or pivotal movement of the link 19 relative to the tractor is permitted, and this movement is utilized to steer the front or dirigible wheels 2 of the tractor by the means now to be described.

Near its upper end the sleeve 17 of the casting 16 is provided with a laterally extending arm 33, preferably formed integral with the sleeve 17 although it is to be understood that the arm 33 may be separately formed and rigidly secured to the sleeve 17 in any manner desired. A laterally extending link 34 is bolted to the arm 33 at one end, and at the other end the link 34 is pivotally connected by means of bolt 35 to a second and forwardly extending link 37. For this purpose the link 34 may be provided with a clip or bracket 38 riveted or otherwise secured thereto and having an offset portion overlying the top of the forwardly extending link 37 and receiving the pivot bolt 35 in the manner best shown in Figure 4.

Figure 2:
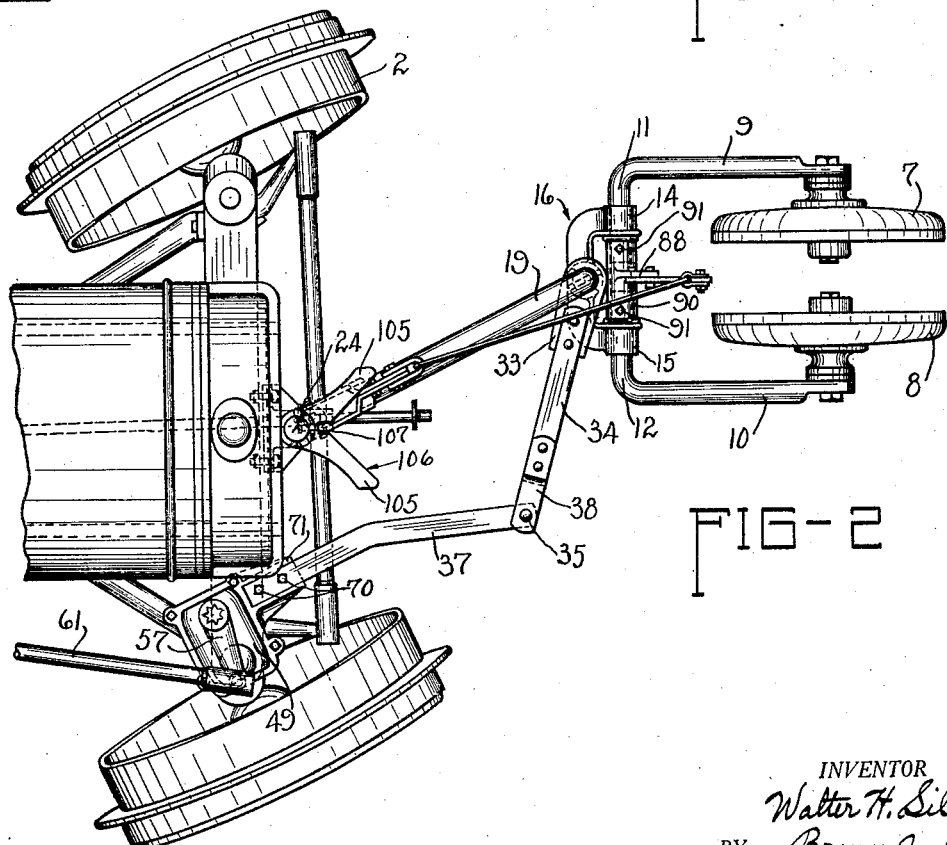
Figure 2 is a view similar to Figure 1 but on an enlarged scale and showing the position of the different parts of the tractor guide when the latter has been operated to shift the steering wheels of the tractor.

An important feature of my invention lies in the manner of connecting the link 37 to the dirigible wheels 2 of the tractor. As best shown in Figures 2, 4 and 7, the right hand steering spindle 40 journaled in the right hand yoke 41 of the front axle is provided with a gear member 42 having an elongated split sleeve 44, the lower end of which embraces the serrated end 45 of the steering spindle 40 to which the gear member 42 is securely clamped by means of a split clamping collar 46 and clamping bolt 47. The gear member 42 is enclosed in a supporting housing 49 which comprises upper and lower sections 50 and 51 and which are clamped together by means of bolts 52. The supporting housing 49 is journaled upon the upper portion of the elongated sleeve 44 of the gear member 42.

A second gear member 54 meshes with the teeth of the gear member 42 and is provided with an elongated hollow hub 55 by means of which the gear member 54 is journaled in bearing openings in the supporting housing 49. The upper portion of the hub 55 projects through the upper section 50 of the housing 49, and to this upwardly projecting portion a steering crank arm 57 is clamped, as by means of a clamping bolt 58, the extended portion of the hub 55 being serrated to present a better clamping surface to the steering crank arm 57.

As best shown in Figure 7, the crank arm 57 extends outwardly in such a position that the upturned end 59 thereof is substantially over the axis of the steering spindle 40 of the right hand wheel. The portion 59 of the steering arm 57 is provided with the usual ball and socket connection with the drag link 61. At its rear end the drag link 61 is pivotally connected to the arm 63 on the lower end of the steering column 64. On the upper end of the steering column 64 is a worm gear 66 which meshes with the steering worm 67 fixed to the lower end of the steering wheel rod 68.

The rear end of the forwardly extending link 37 is bolted, as by bolts 70 to a forward extension 71 fixed to or integrally formed with the housing 49.

The lengths of links 19, 34 and 37 have been so proportioned that the axes defined by the upturned rear end 24 and the downturned end 18 of the link 19, together with the axes defined by the pivot bolt 35 and the steering spindle 40 all lie at the apices of a parallelogram so that, by reason of this arrangement, the bell wheels 7 and 8 together with the associated arms 9 and 10 are always directed parallel to the general line of advance in all the positions they may assume and which in their steering or guiding movement occupy successive parallel planes. Furthermore, the general direction of the forwardly extending link 37 is always parallel to link 19 so that the angular movement of the link 37 is always proportional to the relative displacement of the guiding elements 7 and 8.

As stated above, it is desirable to be able at all times to steer the tractor by means of the usual manually operated steering mechanism regardless of the fact that the steering or dirigible wheels of the tractor may be under the control of the tractor guide. In order that this result may be attained, the gear set above described, has been provided. The operation of this gear set is substantially as follows. This gear set operates somewhat on the order of a planetary differential, that is, when the housing 49 is rotated about the axis of the steering spindle 40 no movement of the steering spindle 40 is effected if the gear sector 54 is free to rotate about its own axis. If, on the other hand, the gear sector 54 is held from rotation then angular movement of the housing will be transmitted directly to the spindle 40 through the gear sectors 54 and 42. Conversely, if the housing 49 is held from angular movement then rotation of the gear sector 54 will occasion rotation of the gear sector 42 which, as described above, is fixedly secured to the upper end of the spindle 40. The differential mechanism I have provided is therefore operable to allow the dirigible wheels to be under the control of both the manually operated steering mechanism on the tractor and the tractor guide. If, for example, the steering crank arm 57 is held or restrained from rotating, then movements of the housing 49 will turn the steering spindle 40 through substantially the same amount of angular displacement. On the other hand, when the housing 49 is held in any given position, the steering crank arm 57 may be rocked to steer the dirigible wheels 2 in the usual manner. Thus, when the guiding wheels 7 and 8 are in contact with the ground, as indicated in Figure 3, the natural side draft may be utilized to prevent angular movement of the housing 49, whereupon the dirigible wheels 2 may be turned by rocking the steering crank arm 57 by the usual steering means on the tractor.

In this connection it is to be understood that, in its broader aspects, the structure of the tractor guide is one form of irreversible steering mechanism. This is true because the guide wheels 7 and 8 when in operative ground engaging position are irreversible, that is, the furrow or other means to which the guide wheels are responsive can swing them to steer the tractor wheels but due to the side draft mentioned the tractor wheels cannot swing the guide wheels. This feature of irreversibility of the tractor guide makes it possible to have the conventional manually operated steering means available at all times to steer the tractor in the usual manner. At the same time, if the guiding furrow down which the guiding wheels 7 and 8 are passing, curves to either direction then the link 19 swings relatively to the tractor and carries with it the link 37 and the associated housing 49. Under these conditions, if the steering arm 57 is prevented from rotating, the angular movement of the housing effected by the swinging of the link 19 is operable to shift the dirigible wheels 2 of the tractor to follow the furrow. The particular steering means illustrated is of the well known type frequently referred to as irreversible steering mechanism, that is, the steering worm 67 can be turned to operate the worm gear 66, but the latter cannot be turned to rotate the steering worm 67. In other words, the steering crank arm 57 remains in any position to which it is moved by the drag link 61.

A very desirable characteristic of the above described construction, incident to the provision of the housing 49 and associated structure, is that if the operator finds that although the tractor is being guided in a straight course, it is not being guided directly over the center of the furrow, the operator need merely turn the steering wheel slightly in one direction or the other to bring the tractor over the center of the row and then release the steering wheel after which the tractor guide will continue to hold the tractor to its course. In other words, the lateral position of the guide wheels 7 and 8 with respect to the front wheels of the tractor when positioned for straight ahead travel may be varied by merely operating the steering wheels of the tractor.

Another important feature of the present invention resides in the provision of means for raising and lowering the bell wheels 7 and 8 by means of the usual power lift device on the tractor. Referring now more particularly to Figures 3 and 4, it will be observed that a fork member 80 comprising two spaced apart arms 81 is pivoted for fore and aft swinging movement on the link 19, this pivotal movement being attained through the use of a pivot pin 83. The upper end of the fork member 80 is provided with a clevis 84 which is connected to a link 86 which, at its forward end, is connected to a clevis 87 on the upper end of an arm 88 rigidly secured to the crank axle members 11 and 12 by means of a casting 90. As shown in Figure 2, the casting 90 is of cylindrical formation and is adapted to receive the inner ends of the crank axles 11 and 12. Set screws 91 are provided for the purpose of securing the crank axles 11 and 12 to the casting 90, and by this means lateral adjustment of the guide wheels 7 and 8 relative to one another is had, thereby accommodating the guide wheels to furrows of different dimensions. The lower ends of the arms 81 are pivoted to the trunnions of a sleeve 95 journaled on a downwardly extending cylindrical portion 96 of a horizontal sleeve 97. This latter sleeve is slidably mounted for limited movement on the cylindrical portion 98 of a fore and aft extending link 99 which is connected at its rear end to a pendant swinging link 100 suspended from the tractor frame, as best shown in Figure 3. This swinging link 100 is link connected to the power lift crank 5 so that when the power lift is tripped the link connecting the crank 5 with the swinging link 100 is shifted longitudinally of the tractor, this occasioning a corresponding movement of the link 99.

The cylindrical portion of the link 99 is provided with a pair of washers 102 and 103 held against movement along the cylindrical portion in one direction by cotter pins 104, the washers 102 and 103 thus defining and limiting the sliding movement of the sleeve 97 on the link 99. The limited movement referred to is provided for the purpose of allowing the guiding wheels 7 and 8 to have some up and down play without disturbing the connections with the power lift.

Referring, now, more particularly to Figure 4, it is to be noted that the fork member 80 has the arms 81 thereof bent laterally at their upper ends so as to lie closely adjacent each other. Formed integrally with the casting 25, preferably near the upper portion thereof, are two forwardly and outwardly extending fingers 105 having rearwardly converging guide surfaces 106. At the junction of these surfaces a rectangular recess 107 is provided, the width of which is just sufficient to receive the upper end of the fork member 80. When the fork member 80 is held in position in the recess 107 the link 19 is prevented from swinging laterally and is securely retained in straight ahead position.

The operation of the means for raising and lowering the guide wheels 7 and 8 is substantially as follows. When the power lift 4 is tripped in the position shown in Figure 3, the fork member 80 is rocked counterclockwise, a forward thrust being exerted upon the links connecting the fork member 80 with the power lift crank arm 5. As the fork member 80 is rocked in a counterclockwise direction the upper portion thereof moves rearwardly so that irrespective of what position the tractor steering wheels may be in, the guiding fingers 105 guide the fork member into the recess 107. This action forces the tractor guide into a straight ahead position and also locks the same against any lateral movement, and at the same time straightening the tractor steering wheels. By securing the swinging member 80 in the recess 107 and thus preventing lateral movement of the link 19, the steering effort transmitted through the usual steering means on the tractor is effective in steering the dirigible wheels 2 of the tractor in the usual manner, the fact that the link 19 is positively prevented from swinging laterally ensures that all of the steering effort is transmitted to the steering wheels of the tractor. Tripping the power lift 4 the second time rocks the fork member 80 in a counterclockwise direction and provides for the positioning of the guide wheels 7 and 8 back into the position in which they are shown in Figure 3.

While I have shown and described the preferred construction in which my invention is to be embodied, it is to be understood that widely different means may be employed in the practice of the broader aspects of my invention.

What I claim, therefore, and desire to secure by Letters Patent is:—

1. The combination with a tractor having dirigible wheels and a manually controlled steering means for said wheels on the tractor, of a steering device for automatically controlling the position of said wheels, both of said steering means being simultaneously operable to steer said dirigible wheels, said steering device being movable vertically to inoperative position, and means for preventing lateral movement of the device when in inoperative position.

2. The combination with a tractor having dirigible wheels and a manually controlled steering means for said wheels permanently connected with said wheels, of a steering means also operable to steer said dirigible wheels and including a ground contacting element and connections therefrom to said dirigible wheels, means subjecting each of said steering means to the steering reaction developed by the other, and means for optionally locking either of said steering means to prevent movement thereof and to effectively resist the reactions developed by the other steering means.

3. The combination with a tractor having dirigible wheels, of means adapted to be manually operated by the operator for steering said wheels, separate means also adapted for steering said wheels, both of said means including parts transmitting the steering reaction developed by the operation of either of said means to the other of said means, whereby when either of said means is held the other can be actuated to steer said dirigible wheels, and means for holding either of said steering means.

4. The combination with a tractor having dirigible wheels, of means adapted to be manually operated by the operator for steering said wheels, said means including irreversible parts, means adapted to be automatically operated by contact with the ground for steering said wheels, both of said means including parts transmitting the steering reaction developed by the operation of either of said means to the other of said means, whereby when either of said means is held the other can be actuated to steer said dirigible wheels, and an optionally operated latch for holding the automatic means against movement.

5. The combination with a tractor having dirigible wheels, of means for automatically controlling said wheels including ground contacting elements, latch means for locking said elements relative to the tractor, and manually operated steering means reacting against said automatic means for controlling said dirigible wheels when said ground contacting elements are locked.

6. The combination with a tractor having dirigible steering wheels, of means pivoted to the tractor and provided with guide elements adapted to follow a furrow and automatically steer said wheels, manually operated steering means including parts for exerting a force between said pivoted means and said dirigible wheels whereby said manually operated means is capable of steering said dirigible wheels when said pivoted means is prevented from turning relative to the tractor, and a lock for holding said pivoted means in a given position relative to the tractor.

7. In combination, in a tractor having front dirigible wheels and a power lift including a swinging crank, a steering device pivoted to the tractor independently of said dirigible wheels for both lateral and vertical swinging, connections between said device and said wheels whereby lateral swinging thereof steers said wheels, and link connections from said crank to said steering device to raise the same to and from operative position.

8. In combination in a tractor having front dirigible wheels and a power lift, a steering device pivoted to the tractor for both lateral and vertical swinging connections between said device and said wheels whereby lateral swinging thereof steers said wheels, manually operable means to steer said wheels independently of the operation of said steering device, connections from said power lift to said steering device to raise the same to and from operative position, and means for locking said steering device when in raised position.

9. The combination with a tractor having dirigible wheels, of a steering device pivoted to the tractor for automatically guiding the tractor, said device comprising a link swingable about a vertical axis on the tractor, a guiding element and support therefor comprising a vertically swinging member, operative connections between said link and wheels, and means fulcrumed on said link for raising and lowering said vertically swinging member.

10. The combination with a tractor having dirigible wheels of a manually operable steering mechanism and an automatic steering mechanism for guiding the tractor by contact with the ground, both of said mechanisms including connections to said dirigible wheels whereby either mechanism may be operated without disconnecting the other, and cooperating means on the tractor and on one of said steering mechanisms for moving said one steering mechanism to and locking the same in inoperative position whereby steering effort applied through the other of said steering mechanisms is effective to steer said dirigible wheels.

11. A tractor having dirigible wheels and comprising, in combination, a gear member connected with said dirigible wheels, a support journaled coaxially of said gear member, a second gear member meshed with the first gear member and journaled on said support, manually operable steering means connected with said second gear and having provision for holding the same in adjusted position, and a steering device connected with said support and including a contact element operable to steer the tractor by contact with the ground and latch means for optionally holding the steering device against movement.

12. The combination with a tractor having dirigible wheels and a power lift, of a steering device for controlling said wheels, connections between said device and power lift for raising and lowering said device to and from inoperative position, means cooperating therewith to hold said device in fixed relation to the tractor when in raised position, and manual steering means reacting against said steering device when in raised position for shifting said wheels relative to said steering device.

13. A steering device for tractors comprising a laterally movable link adapted to be pivoted to the tractor, a casting journaled thereon at the forward end thereof to swing about a vertical axis and having a journal extension defining a horizontal axis, a supporting arm journaled in said extension and provided at its forward end with a guiding element, connections on said casting whereby lateral movement thereof is adapted to actuate the dirigible wheels of the tractor to steer the same, and means including a lever mounted on said movable link for raising and lowering said supporting arm.

14. A steering device for tractors having a pair of spaced dirigible wheels, said device comprising a laterally movable link adapted to be pivoted to the tractor centrally thereof, a member journaled thereon at the forward end thereof to swing about a vertical axis and having a journal extension defining a horizontal axis, a supporting arm journaled in said extension and provided at its forward end with a guiding element, a laterally extending link mounted on and movable with said member, a third link pivoted to the last mentioned link and adapted to be pivotally connected with one of said dirigible wheels whereby transverse bodily movement of said arm and element steers the tractor.

15. The combination with a tractor having dirigible wheels, a power lift, and manually operated irreversible steering mechanism including a steering arm, of an automatic steering device operable to steer the tractor by contact with the ground, said device comprising a swinging member pivoted to the front of the tractor, guiding elements swingably mounted on said member both vertically and horizontally, a laterally extending arm movable with said elements, a link connecting said arm with said dirigible wheels and extending substantially parallel with said swinging member whereby said guiding elements occupy positions in successive parallel planes in steering the tractor, differential means carried by said link and connected with the dirigible wheels and said steering arm whereby the steering arm may be actuated to shift the dirigible wheels relative to the guiding elements when the latter are stationary, and optionally operated means for holding said elements stationary, said means being operable by the power of the tractor.

16. The combination with a tractor having a power lift, of a steering device for the tractor including a pair of connected members, one pivoted for lateral swinging and the other for vertical swinging, and means including a pair of swinging links and a lost motion connection therebetween whereby the power lift is operable to raise the vertically swinging member.

17. In combination, in a vehicle having a dirigible wheel pivoted to the vehicle for lateral swinging, manual steering means for said wheel, an auxiliary steering device for steering said vehicle by contact with the ground, and connections between each steering means and the wheel and including mutually interacting parts whereby either steering means is operable to shift the dirigible wheel by reacting against the other.

18. In combination, in a tractor having front dirigible wheels, means pivoted to the front of the tractor and automatically operable to steer the tractor down a furrow, power means for raising said steering means out of engagement with the ground, and means for returning the steering means to a fixed position relative to the tractor when the steering means is raised.

19. The combination with a tractor having a power lift, of a steering device for the tractor including a pair of connected members, one pivoted for lateral swinging and the other for vertical swinging, and connections between the vertical swinging member and the power lift whereby the latter is operable to raise the vertically swinging member, said connections including a pivoted fork member embracing and pivoted to the laterally swinging member and movable into fixed engagement with the tractor when the vertically swinging member is raised.

20. The combination with a vehicle having dirigible wheels, of two movable members each having separate steering control means associated therewith, each control means including means for preventing movement of the movable member with which it is associated when the control means is not in use, and mechanism connecting said members with said dirigible wheels and including means whereby the movement of either member reacting against the other member causes steering actuation of said dirigible wheels.

21. The combination with a vehicle having dirigible wheels, of two separate steering means mounted on the vehicle and having operative connection with the dirigible wheels, differential means interposed in said connection and arranged to transmit the reaction of one steering means to the other, and means associated with each of said steering means for holding the same immovable with respect to the vehicle so as to effectively resist said reaction.

22. The combination with a vehicle having dirigible wheels, of steering means therefore including an irreversible worm and gear means stationarily mounted on the vehicle, a link movable thereby and connected to steer said wheels, a second irreversible steering mechanism connected to steer said wheels and including a swinging link, and means directing the reaction of one of said links against the other whereby either link can be utilized to steer the wheels of the vehicle.

23. The combination with a vehicle having a dirigible wheel, of two separate steering control means associated therewith, each including a movable member adapted to be shifted to steer the dirigible wheel, and means whereby the movement of either member reacting against the other member causes steering actuation of said dirigible wheel, one of said members being connected with said last named means substantially in line with the steering axis of the dirigible wheel.

24. In combination, in a vehicle having front dirigible wheels, means pivoted to the front of the vehicle and adapted to contact with the ground to automatically steer the vehicle, power means for raising said steering means out of engagement with the ground, and means for holding the steering means in a fixed position relative to the vehicle when the steering means is raised.

25. The combination with a tractor having dirigible wheels, of a steering device for controlling said wheels, means for raising and lowering said device to and from inoperative position, means cooperating therewith to hold said device in fixed relation with respect to the tractor when in raised position, and manual steering means reacting against said steering device when in raised position for shifting said wheels to steer the same.

26. The combination with a tractor having dirigible wheels, a power lift, and manually operated irreversible steering mechanism including a steering arm, of an automatic steering device comprising a member subjected to steering force and movably mounted on the tractor, differential means associated with said member and connected with the dirigible wheels and said steering arm whereby the steering arm may be actuated to shift the dirigible wheels relative to the automatic steering device when the latter is stationary, and optionally operated means for holding said device stationary.

In witness whereof, I hereunto subscribe my name this 17th day of September, 1930.

WALTER H. SILVER.